United States Patent [19]

Schrors

[11] Patent Number: 4,735,073
[45] Date of Patent: Apr. 5, 1988

[54] PRESSURE AND HEAT TREATMENT ROLL

[75] Inventor: Günter Schrors, Tonisvorst, Fed. Rep. of Germany

[73] Assignee: Eduard Küsters Maschinenfabrik GmbH & CO KG, Krefeld, Fed. Rep. of Germany

[21] Appl. No.: 826,108

[22] Filed: Feb. 5, 1986

[30] Foreign Application Priority Data

Feb. 6, 1985 [DE] Fed. Rep. of Germany ....... 3503899

[51] Int. Cl.⁴ ............................................. B21B 27/08
[52] U.S. Cl. ................................. 72/200; 29/116 AD; 72/243; 72/245; 100/162 B
[58] Field of Search .................. 72/245, 243, 200-202; 29/113 R, 113 AD, 116 R, 116 AD; 100/162 B

[56] References Cited

U.S. PATENT DOCUMENTS

| | | |
|---|---|---|
| 3,023,695 | 3/1962 | Kusters . |
| 4,187,594 | 2/1980 | Appenzeller .................. 29/116 AD |
| 4,282,638 | 8/1981 | Christ et al. .................... 29/116 AD |
| 4,282,639 | 8/1981 | Christ et al. .................... 29/116 AD |
| 4,459,726 | 7/1984 | O'Brien et al. ................. 29/116 AD |
| 4,506,421 | 3/1985 | Appenzeller et al. ......... 29/116 AD |
| 4,578,847 | 4/1986 | Ahrweiler ................. 29/116 AD X |

FOREIGN PATENT DOCUMENTS 1026609  6/1970  Fed. Rep. of Germany .
2744524  7/1979  Fed. Rep. of Germany .

OTHER PUBLICATIONS

Paper Trade Journal, "Temperature Controlled Rolls", Oct. 15, 1980 pp. 41–46.

Primary Examiner—Lowell A. Larson
Assistant Examiner—Steve Katz
Attorney, Agent, or Firm—Kenyon & Kenyon

[57] ABSTRACT

A roll for treating a web of material includes a hollow roll supported for rotation about a stationary cross piece. Between the inside circumference of the hollow roll and the cross piece, a longitudinal chamber filled with temperature-controlled pressure liquid is provided, in which a lengthwise subdivision is arranged so that the flow of the pressure liquid in the two partial longitudinal chambers is in opposite directions in order to obtain a uniform temperature distribution along the roll.

8 Claims, 1 Drawing Sheet

PRESSURE AND HEAT TREATMENT ROLL

BACKGROUND OF THE INVENTION

This invention relates to a roll for the pressure treatment of a web of material which includes an hollow outer roll and crosspiece extending therethrough with a longitudinal chamber filled with pressure fluid formed between the cross piece and hollow roll, in general and more particularly to apparatus for maintaining a constant temperature in the pressure fluid in such a roll.

A roll for the pressure treatment of webs of material which includes a hollow roll forming the working roll circumference, a cross piece which goes through the hollow roll lengthwise and leaves radial spacing all around from the inside circumference of the hollow roll and protrudes in the lengthwise direction from the hollow roll at the ends, longitudinal seals arranged at the cross piece and extending over a substantial part of the length of the hollow roll and defining a longitudinal chamber located between the inside circumference of the hollow roll and the cross piece in the action plane of the roll, a feed line and a discharge line for pressure liquid which open into the longitudinal chamber, and a temperature setting device for the pressure liquid is described in German Pat. No. 10 26 609. The longitudinal chamber lies on the side of the rolling gap and supports the hollow roll from the inside on a pressurized liquid cushion as if floating. The support is not purely hydrostatic. Rather, an hydrodynamic equilibrium is maintained, in which pressurized liquid is fed to the longitudinal chamber at the feed line and is removed again from the longitudinal chamber at the discharge line.

In many cases not only is a longitudinal chamber formed on the side of the rolling gap filled with pressurized liquid, but the opposite longitudinal chamber which accounts for the remainder of the space between the inside circumference of the hollow roll and the cross piece is also filled. The resulting forces which form the line pressure at the rolling gap are then obtained from the difference of the pressures, taking the effective area of the longitudinal chambers into consideration.

It is also known in such rolls to influence the temperature of the working roll circumference via appropriate temperature control of the pressurized liquid. The feeding and discharging of liquid in such cases is done at opposite ends of the roll so that a flow over its entire extent is obtained. If the requirements as to constant temperature transversely to the web of material or along the roll are stringent, problems arise, however, because a temperature change always occurs along the flow path. Practice has shown that, for instance, in the case of heated rolls, a temperature difference of up to 10° C. can prevail between the ends of the roll if the flow is only in one direction; for many applications of interest, this temperature difference is too high.

In a roll of the type of German Pat. No 10 26 609, it is, therefore, known already to have heated pressurized liquid flowing through the longitudinal chamber located on the side of the rolling gap from one end of the roll to the other in one direction and through the opposite longitudinal chamber in the other direction. The effect on the hollow roll is made up of the effects of the two longitudinal chambers together, and in this manner an equalization of the temperature gradients and a rather good temperature constancy along the roll is obtained. The prerequisite therefor, however, is a roll with two longitudinal chambers through which liquid can flow along the entire length of the roll.

This condition, however, is not always met.

A first example where this condition is not met is the case where the opposite, so-called, leakage chamber is not filled. This is the case, for instance, in what is known as an easy-running roll according to German Pat. No. 27 44 524, in which special precautions are taken in order to avoid hydrodynamic resistances at high operating speed. This includes insuring that no pressurized liquid accumulates in the leakage chamber.

Another example occurs when the longitudinal chamber which is primarily responsible for the generation of the line pressure is located on the side of the rolling gap, but is not continuous over the entire length of the roll. Rather, it is subdivided in the transverse direction so that it forms, for instance, three zones, of which two narrower ones are located at the ends of the roll and the larger one in the center. This can be necessary for influencing the line pressure. Because a continuous flow over the entire length of the roll cannot be generated, special problems as to the uniformity of the temperature arise here.

It is an object of the invention to reduce or compensate for the temperature gradient even in these cases.

SUMMARY OF THE INVENTION

The present invention accomplishes this by providing at least one longitudinal subdivision in the longitudinal chamber forming two partial longitudinal chambers, and insuring that the flow of the pressure liquid in the two partial longitudinal chambers is in opposite directions.

The action of this design is such that the temperature gradient caused by the customary one-sided flow is equalized, at least partially, by maintaining a counterflow in one and the same longitudinal chamber which is formed between two longitudinal seals which are adjacent to each other in the circumferential direction and are sealed against the pressurized liquid. The temperature gradient in the one partial longitudinal chamber is opposed by a temperature gradient of opposite direction in the other partial longitudinal chamber so that, as a result, every point of the hollow roll is subjected to the same mean temperature.

Generating the counterflow in one and the same longitudinal chamber is advantageous also in another aspect. When the pressurized liquid passes, in the circulation known from the roll according to German Pat. No. 10 26 609, through the so-called pressure chamber located on the side of the rolling gap, it is at a pressure higher than the pressurized liquid returning to the so-called leakage chamber facing away from the rolling gap. This can be accomplished in a closed loop only if the pressurized liquid passes a choking point. The pressurized liquid must, therefore, be pumped through the pressure chamber against this resistance. If the throughput quantity and thereby, the flow velocity are to be increased, considerable pumping power is required which increases the cost. In addition, however, a pressure gradient occurs along the pressure chamber if the flow resistance along the pressure chamber is increased; this imperils the uniformity of the line pressure so that possibly, nonuniformity of the line pressure must be tolerated for a somewhat more uniform temperature and accelerated pumping of the pressurized liquid.

If, however, the counterflow is maintained in one and the same longitudinal chamber in the manner according to the present invention, the flow takes place at one and the the same pressure level and no resistance in the form of a choking point of the flow need to be overcome, so that the circulating amount can be increased without excessive power. Any pressure drop which may occur along the flow path is compensated by the opposite pressure drop on the return. The outgoing and return flow need to take place only in one and the same longitudinal chamber, i.e., at the substantially same pressure level, in contrast to the known design.

It is possible in principle to provide a separate feed line and a separate discharge line for each partial longitudinal chamber and to provide the feed and discharge line of adjacent partial longitudinal chambers at different ends thereof. The alternative is to let the pressurized liquid at the end of the roll which is opposite the first feed line pass into an adjacent partial longitudinal chamber and to let it flow back in that chamber in a direction opposite the first direction.

It is further understood that the invention can find application for any kind of roll temperature influenced via the hydraulic liquid, i.e., to cooled as well as heated rolls.

The invention is realized already if the customary longitudinal chamber is divided only once, so that only two partial longitudinal chambers are provided. However, it is also possible to provide several longitudinal subdivisions and to let the pressurized liquid run in meander-fashion. In all such cases the pressurized liquid passes in and out at one end.

The subdivision need not be a seal. It is not important that the adjacent partial longitudinal chambers are hermetically sealed against each other in the circumferential direction. The pressure in partial longitudinal chambers adjacent in the circumferential direction is substantially the same, as compared to the longitudinal seals forming the chamber which must essentially seal against the actual pressure in the longitudinal chamber toward the outside. The lengthwise subdivisions rather need to be only pure flow dividers.

A first embodiment includes a radially movable element which may be a strip radially guided in a slot of the cross piece or a strip which can follow the changes of the distance between the cross piece and the inside circumference of the hollow roll, maintaining its divider action. Such changes occur if the cross piece is bent relative to the hollow roll under the action of the line pressure. The distance changes can be quite considerable in large rolls with a length of, for instance, 8 to 10 meters and can amount to about 25 mm. Resilient contact can be maintained by a backing spring or liquid pressure.

Another embodiment is one in which the longitudinal subdivision is no longer arranged radially, i.e., it is symmetrical but is inclined and follows the changes of the distance between the cross piece and the inside circumference of the hollow roll by changing the inclination of the setting.

It should be pointed out that the term "longitudinal chamber" can mean a longitudinal chamber located on that side of the rolling gap in which the high pressure for generating the line pressure prevails, as well as a longitudinal chamber which is located on the opposite side and can likewise be filled with pressure liquid and then also has a feed line and a discharge line. If, for instance, the pressure chamber is subdivided, the leakage chamber is provide with the lengthwise subdivision; if the leakage chamber remains empty it must, of course, be the pressure chamber which is subdivided.

DETAILED DESCRIPTION

Figure 1:
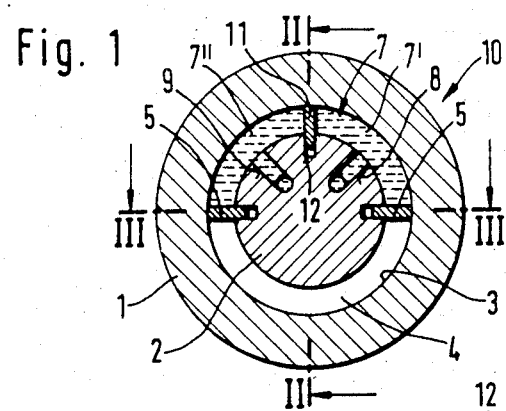
FIG. 1 is a cross section through a roll according to the present invention.
Figure 2:
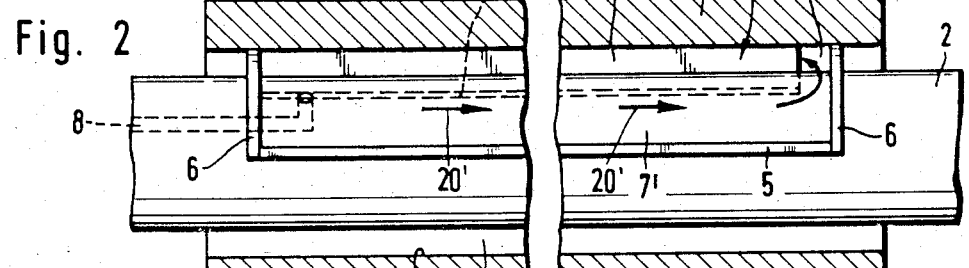
FIG. 2 is a longitudinal section through the plane II—II in FIG. 1.
Figure 3:
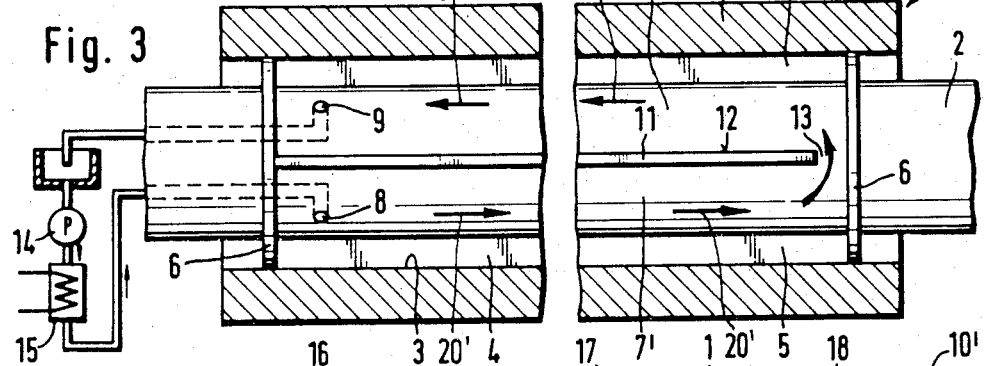
FIG. 3 is a longitudinal section through the plane III—III in FIG. 1.
Figure 4:
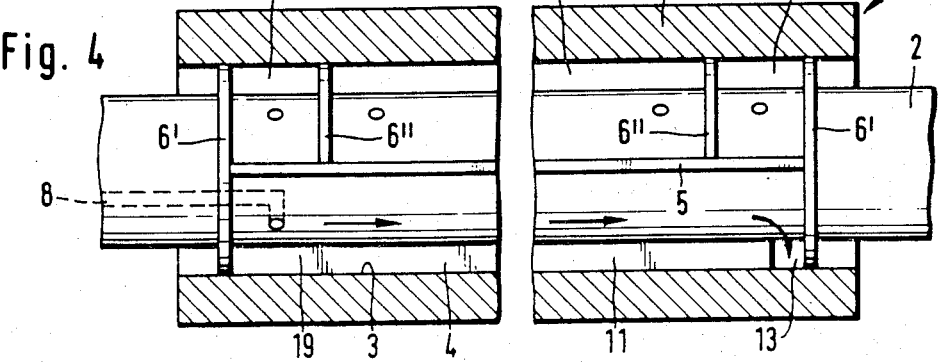
FIG. 4 is a longitudinal section corresponding to FIG. 2 through another embodiment of the invention.

The roll 10 in FIG. 1, comprises a revolving outer hollow roll 1, through which a cross piece 2 extends lengthwise protruding from the hollow roll 1 as can be seen from FIGS. 2 to 4. The ends of cross piece 2 are supported in a roll stand or acted upon by force exertion members such as hydraulic cylinders or the like.

The hollow roll 1 can be fixedly supported at its ends on the cross piece 2 or be capable of being positioned in the radial direction relative to the cross piece 2 on its entire length by a suitable gate guidance. In the space 4 between the cross piece 2 and the inside circumference 3 of the hollow roll 1, longitudinal seals 5 and transverse end seals 6, which are fastened at the cross piece 2 and rest against the entire circumference 3 of the hollow roll 1 divide off a longitudinal chamber 7. This longitudinal chamber 7 can be fed pressurized liquid via a feed line 8 with the liquid discharged again at a discharge line 9. A steady-state hydrodynamic state is, therefore, established and the pressure of the pressurized liquid in the longitudinal chamber 7 acts from the inside against the hollow roll and exerts a force which is uniform over the length of the longitudinal chamber 7. The counterforce is supplied by the bending of the cross piece 2. The seals 5 and 6 are designed so that they can follow the changes in spacing which occur between the cross piece 2 and the hollow roll 1, while maintaining the sealing action.

In the embodiment of FIGS. 1 to 3, the rolling gap is at the top according to FIGS. 1 and 2, and the longitudinal chamber 7 is located on the side of this rolling gap. In the longitudinal chamber 7 a lengthwise subdivision 11 is provided which is realized by a plastic or sheet metal strip guided in a longitudinal slot 12 on the top side of the cross piece 2. The lengthwise subdivision 11 subdivides the longitudinal chamber 7 into two partial longitudinal chambers 7' and 7". In the illustrated embodiment, the longitudinal subdivision 11 is not continuous up to the transverse end seal 6 at the right in FIG. 2, but ends shortly before and leaves a transition 13, at which point the pressurized liquid, which flows in at the end located at the left in FIGS. 2 and 3 from the feed line 8 and which flows on from left to right in the sense of the arrows 20' through the partial longitudinal chamber 7', flows into the partial longitudinal chamber 7" and then flows back, according to FIGS. 2 and 3, from the right to the left in the sense of the arrow 20", until it is discharged again at the end of the partial longitudinal chamber 7" located at the left according to FIGS. 2 and 3.

The temperature at the outer circumference of the hollow roll 1 is to be influenced via the pressurized liquid. If a temperature increase is involved, the pressurized liquid is brought up to temperature, after it is brought up to the pressure by the pump 14, by a temperature setting device in the form of a heat exchanger 15 schematically indicated in FIG. 3 to the left and is supplied to the feed line 8 under pressure and elevated temperature. There, the hot pressure liquid enters the partial longitudinal chamber 7'. The temperature drops from left to right according to FIGS. 2 and 3. In the right-hand region, the temperatures in the partial longitudinal chamber 7' and 7" differ only little. In the partial longitudinal chamber 7", the temperature drops further, however, and specifically from right to left so that, in the left-hand region, hot pressure liquid in the partial longitudinal chamber 7' confronts the heavily cooled-down pressure liquid in the partial longitudinal chamber 7", and thus, an equlization is obtained which leads to the condition that the temperatures at the left and right ends of the hollow roll 1 differ only by a small amount.

In the embodiment of FIGS. 1 to 3, the lengthwise subdivision 11 is provided in a longitudinal chamber 7 which is located on the side of the rolling gap and, therefore, contributes substantially to the formation of the line pressure. The opposite longitudinal chamber which occupies the rest of the circumference, is not empty but contains the leakage oil which passes at the longitudinal seals 5 and is continuously drained therefrom. In some cases, a certain amount of pressure is intentionally maintained in this longitudinal chamber disposed opposite the longitudinal chamber 7 so that the effective pressure is obtained from the pressure difference.

When the opposite chamber contains fluid under pressure, the longitudinal subdivision 11 does not have to be provided on the side of the rolling gap. In the case of the roll 10' shown in FIG. 4, the transverse end seals 6' extend over the entire circumference and, by means of additional semiannular transverse seals 6" there are formed, on the side of the rolling gap, three chambers 16, 17 and 18 each of which have separate feed and discharge lines only indicated in FIG. 4 and in which different pressures can be maintained if required. A counterflow continuous over the entire length, thus, cannot be realized here. In this case the lengthwise subdivision is provided instead on the opposite side in the longitudinal chamber 19 which is supplied for this purpose with temperature controlled pressure liquid. Also in this case, the lengthwise subdivision 11 leaves a passage 13, through which the pressure liquid passes into the partial longitudinal chamber which is located behind the plane of the drawing and is adjacent in the circumferential direction, and flows back there according to FIG. 4, from right to left toward the left end of the hollow roll 1 where it is drained off.

It is not necessary that the longitudinal seals 5 be arranged exactly opposite each other in the meridian plane of the cross piece. The invention can also be used for longitudinal seals 5 which are placed closer together in the circumferential direction and form the narrow longitudinal chamber 7. Also, the longitudinal subdivision 11 need not leave the passage 13. The same effect is also obtained if each partial longitudinal chamber 7 and 7' has a feed line of its own at one end and a discharge line of its own at the other end. Important is only that the flows in partial longitudinal chambers adjacent in the circumferential direction are in opposite directions.

The longitudinal subdivision 11 can be designed, in the manner indicated in FIG. 1, as a straight strip which is disposed in a slot 12 and holds contact at the inner circumference 3 of the hollow roll 1 by hydraulic pressure acting against it from below or by springs.

Figure 5:
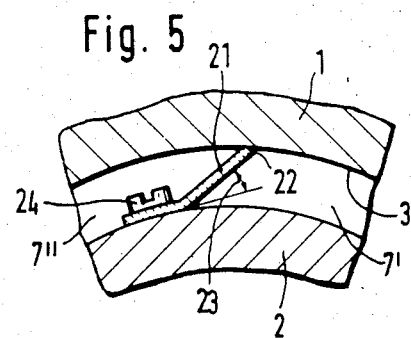
FIG. 5 is a partial section in the region of the lengthwise subdivision in a modified embodiment.

However, it is also possible to use the embodiment which is indicated in FIG. 5. To the outside circumference of the cross piece 2, a longitudinal subdivision 21 in the form of an inclined strip of metal or plastic is fastened by means of screws 24. The screws 24 are provided along a lengthwise edge of the strip while it rests against the inside circumference 3 of the hollow roll 1 with its lengthwise edge 22. The lengthwise subdivision 21 which is substantially planar and is resilient in spring fashion encloses, with the tangential plane at the fastening line given by the screws 24, an acute angle 23. Changes of the distance between the cross piece 2 and the hollow roll 1 are followed by the lengthwise subdivision 21 through a change in the angle 23. The seal between the partial longitudinal chambers 7' and 7" need not be hermetic. It is only necessary to provide a flow division which makes the counterflow possible.

What is claimed is:

1. A roll for the pressure treatment of webs of material comprising:
   (a) a hollow roll forming the working roll circumference having an action plane;
   (b) a cross piece which goes through the hollow roll lengthwise and leaves radial spacing all around from the inside circumference of the hollow roll and protrudes in the lengthwise direction from the hollow roll at the ends;
   (c) longitudinal seals arranged at the cross piece and extending over a substantial part of the length of the hollow roll and defining a longitudinal chamber located between the inside circumference of the hollow roll and the cross piece in the action plane of the roll;
   (d) at least one feed line and one discharge line for pressure liquid which open into the longitudinal chamber;
   (e) a temperature setting device for the pressure liquid;
   (f) at least one longitudinal subdivision in the longitudinal chamber forming two partial longitudinal chambers; and
   (g) said at least one subdivision arranged in cooperation with said at least one feed and one discharge line such as to conduct the flow of the pressure liquid in the two partial longitudinal chambers in opposite directions.

2. The roll according to claim 1, wherein said subdivision comprises an element supported for movement radially relative to the cross piece, said element resting resiliently against the inside circumference of the hollow roll.

3. The roll according to claim 1, wherein said lengthwise subdivision comprises an elastic strip connected to the cross piece along a fastening line at a lengthwise edge with its other lengthwise edge resting against the inside circumference of the hollow roll.

4. The roll according to claim 3, wherein said elastic strip is substantially planar and encloses an acute angle with a plane tangential to the fastening line.

5. The roll according to claim 1 wherein one feed and one discharge line is provided, both located at one end of said longitudinal chamber and wherein said subdivision leaves a passage at the other end of said longitudinal chamber through which pressure fluid can flow from one partial chamber to the other.

6. The roll according to claim 5, wherein said subdivision comprises an element supported for movement radially relative to the cross piece, said element resting resiliently against the inside circumference of the hollow roll.

7. The roll according to claim 5, wherein said lengthwise subdivision comprises an elastic strip connected to the cross piece along a fastening line at a lengthwise edge with its other lengthwise edge resting against the inside circumference of the hollow roll.

8. The roll according to claim 7, wherein said elastic strip is substantially planar and encloses an acute angle with a plane tangential to the fastening line.

* * * * *